United States Patent [19]

Kawada

[11] Patent Number: 5,299,083
[45] Date of Patent: Mar. 29, 1994

[54] READ/WRITE HEAD POSITIONING MECHANISM FOR FLEXIBLE DISK DRIVE DEVICE

[75] Inventor: Junji Kawada, Kanagawa, Japan

[73] Assignee: Mitsubishi Denki Kabushiki Kaisha, Tokyo, Japan

[21] Appl. No.: 995,944

[22] Filed: Dec. 18, 1992

Related U.S. Application Data

[63] Continuation of Ser. No. 684,682, Apr. 12, 1991, abandoned.

[30] Foreign Application Priority Data

Apr. 13, 1990 [JP] Japan .................................. 2-96204

[51] Int. Cl.⁵ .............................................. G11B 5/55
[52] U.S. Cl. .................................................. 360/106
[58] Field of Search ................. 360/99.01, 106, 104, 360/105; 369/219, 215, 249

[56] References Cited

U.S. PATENT DOCUMENTS

| 4,012,780 | 3/1977 | Johnson | 360/106 X |
| 4,545,046 | 10/1985 | Jansen et al. | 369/111 |
| 4,590,529 | 5/1986 | Nikaido et al. | 360/106 |
| 4,607,913 | 8/1986 | Jansen | 350/247 |
| 4,678,951 | 7/1987 | Nikaido | 310/13 |
| 4,864,170 | 9/1989 | Eguchi | 310/12 |
| 4,864,447 | 9/1989 | Takekado | 360/106 |
| 4,868,432 | 9/1989 | Frandson | 310/12 |
| 4,980,876 | 12/1990 | Abate | 360/78.08 X |
| 5,012,372 | 4/1991 | Isomura | 360/106 |
| 5,021,898 | 6/1991 | Sakai | 360/78.04 |

OTHER PUBLICATIONS

"A Head Driving Method," Nikkei Mechanical, Sep. 22, 1986, pp. 48-57.

"Latest Technology, Device and Apparatus on Magnetic Recording," published by Sohgoh Gijutsu Shuppan, Dec. 25, 1984, pp. 72-73.

Primary Examiner—A. J. Heinz
Attorney, Agent, or Firm—Wolf, Greenfield & Sacks

[57] ABSTRACT

A flexible disk apparatus is provided, which comprises a carriage including a read/write head at the tip end thereof and a coil bobbin disposed at the other end thereof, the coil bobbin permitting a voice coil to be connected integrally therewith. The side of the voice coil is located in a magnetic circuit formed of a magnet. The carriage is slidably mounted on a moving guide fixed on a base.

6 Claims, 6 Drawing Sheets

READ/WRITE HEAD POSITIONING MECHANISM FOR FLEXIBLE DISK DRIVE DEVICE

This application is a continuation of application Ser. No. 07/684,682 filed Apr. 12, 1991, now abandoned.

BACKGROUND OF THE INVENTION

1. Field of the Invention

The present invention relates to a flexible disk device for use in an external memory device, etc., of an electronic computer, and more specifically to a driving mechanism for driving a carriage.

2. Description of the Prior Art

Referring to FIG. 7, there is illustrated a conventional flexible disk device in a perspective view which includes a read/write head positioning mechanism with use of a lead screw and a pulse motor, as disclosed in "Magnetic Recording Current Technology, and Apparatuses and Instruments therefor" published by Sogo Gijutsu Shuppan, 1984. In the same figure, designated at 1 is a carriage, 2 is a pulse motor, 3 is a lead screw, 4a is a guide rod, 5 is a read/write head, 6 is a flexible disk cartridge, 7 is a base, 8 is an electric circuit board, 9 is a spindle motor, 11 is a rotary/straight movement conversion mechanism, 51 is a head arm, and 61 is a magnetic disk. Additionally, FIG. 8 is a sectional view illustrating a prior 5.25 inch flexible disk device using a linear pulse motor for a read/write head positioning mechanism, as disclosed in Nikkei Mechanical No. 1986. 9. 22. In the same figure, designated at 2a is a linear pulse motor, 4a is a guide rod, (6a) is a 5.25 inch diskette, and (61a) is a magnetic disk. The like or equivalent portions as those shown in FIG. 7 are designated by like symbols.

Operation of the conventional device is as follows.

In order to move the read/write head which is to move in contact with the upper and lower surfaces of the magnetic disk 61 mounted on the spindle motor 9, in an example illustrated in FIG. 7, for example, a general rotative pulse motor 2 is used to turn the lead screw 3 coupled to a rotor thereof and convert the rotation of the lead screw 3 through the rotary/straight movement conversion mechanism 11, whereby the carriage 1 is moved. Additionally in an example illustrated in FIG. 8, the carriage 1 directly coupled to a rotor of a linear pulse motor 2a undergoes step movement corresponding to applied pulse voltage to position the read/write head coupled to the carriage 1 through the arm 51.

The conventional flexible disk device is constructed as described above. Accordingly, when it is intended to perform information access with larger capacity and at a higher speed compared with the present situation, a pulse motor has a structural limitation due to the restriction of a mechanical machining size to the amount of a minimum step fed by one pulse to prevent the density of a recorded track from being increased. Additionally, such a pulse motor suffers from detuning as the rotor is speeded up and hence fails to track a high speed head movement.

SUMMARY OF THE INVENTION

In view of the drawbacks with the prior art, it is an object of the present invention to provide a flexible disk device with substantially the same shape and size as those of conventional flexible disk devices, the flexible disk device being capable of realizing one having a track density and a track number several times the conventional devices, of having an access to the recording track at a speed several times the conventional devices, and of also reading and writing any information on a conventional flexible disk cartridge or only writing the same.

To achieve the above object, a flexible disk device according to the present invention includes a carriage having a read/write head at the tip end thereof, the carriage further having a coil bobbin at the other end thereof to which bobbin a voice coil is integrally coupled, said voice coil being located in a magnetic circuit formed of a magnet to slidably mount said carriage on a movable guide fixedly mounted on a base.

The above and other objects, features, and advantages of the invention will become more apparent from the following description when taken in conjunction with the accompanying drawings.

DESCRIPTION OF THE PREFERRED EMBODIMENT

Figure 1:
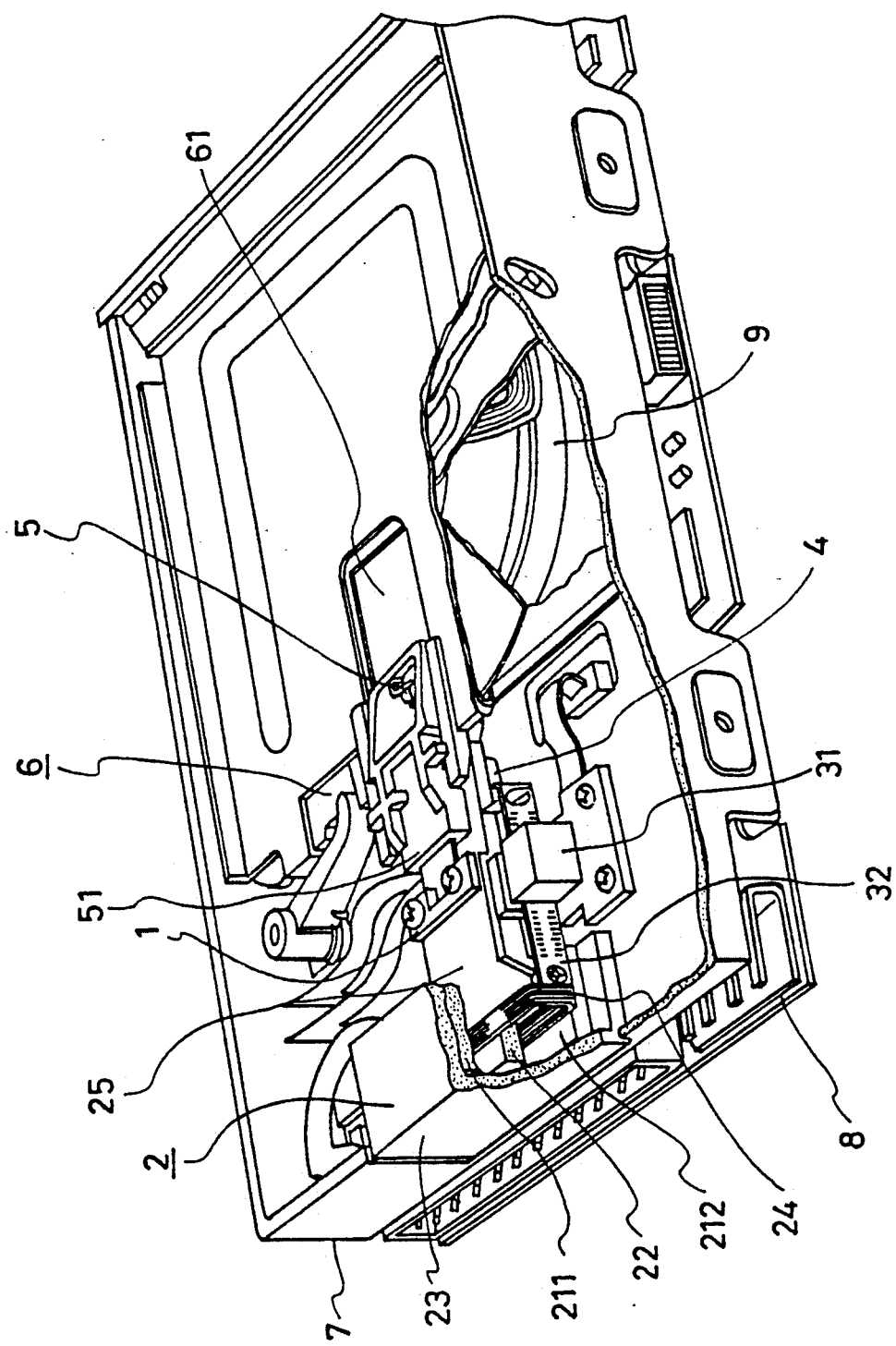
FIG. 1 is a perspective view, partly in section, a flexible disk device according to the present invention.
Figure 2:
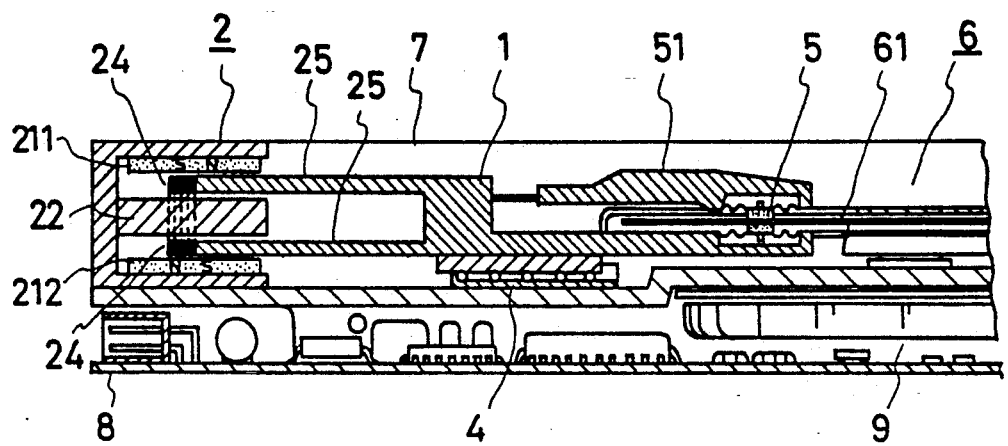
FIG. 2 is a sectional view taken along a central and vertical line of FIG. 1.

In what follows, an embodiment of the present invention will be described. In FIGS. 1 and 2, designated at 1 is a carriage, 2 is a E-shaped magnetic circuit for a voice coil disposed just behind the carriage 1, 31 is an optical linear encoder for accessing a conventional recording track, and 32 is a linear scale movable integrally with the carriage 1 for informing the encoder of positional information of the carriage. Likewise, designated at 4 is a movable guide which is located at the center of gravity of an assembly and disposed just under the assembly, the assembly comprising the carriage 1, a read/write head 5 mounted on the tip end of the carriage 1, a head arm 51, and two coil bobbins 25 disposed on the rear portion of the carriage and the voice coil 24 coupled to the rear ends of the coil bobbins. Designated at 6 is a flexible disk cartridge which comprises a protective casing and a magnetic disk 61, the protective casing including a window formed through a portion of the protective casing to which the read/write head 5 has an access. Designated at 7 is a base, 8 is an electric circuit board, and 9 is a spindle motor and has a function of clamping the magnetic disk 61 on the upper portion of the spindle. The foregoing E-shaped magnetic circuit 2 for voice coil motor comprises an upper magnet 211, a lower magnet 212, a center yoke 22, and an outer peripheral yoke 23. More specifically, one of the coil bobbins 25 is disposed between the magnet 211 and the yoke 22, and a magnetic flux from the magnets 211, 212 flows to the yoke 22 through the bobbins 25, 25 and flows again into the magnets 211, 212 through the outer circumferential yoke 23, thus forming a circulating path.

Figure 3:
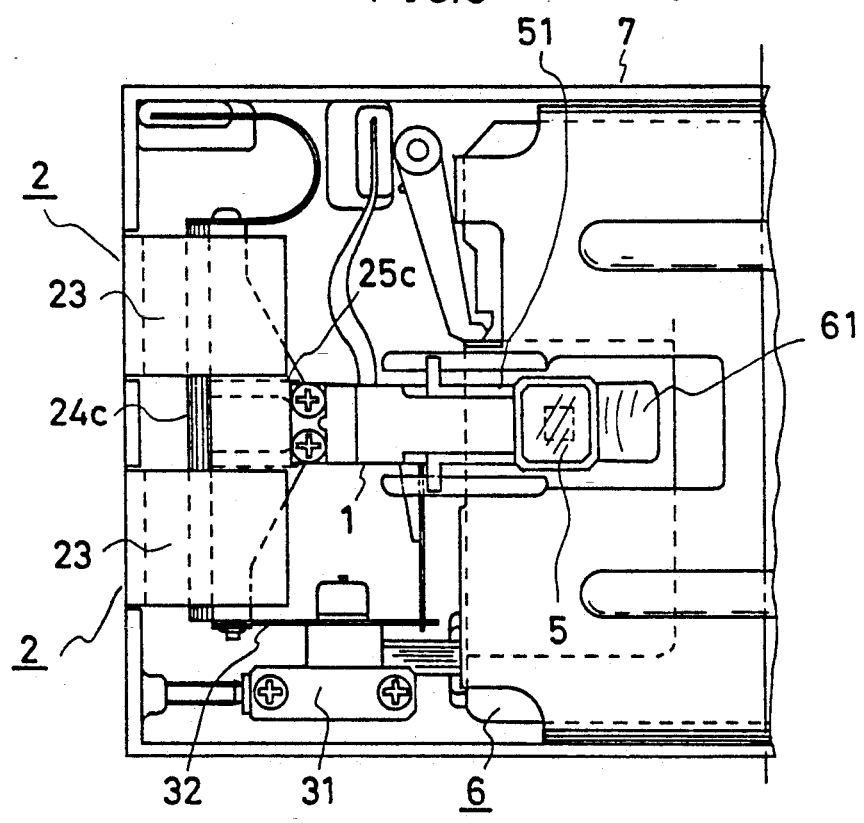
FIG. 3 is a plan view partly illustrating a second embodiment of the present invention.
Figure 4:
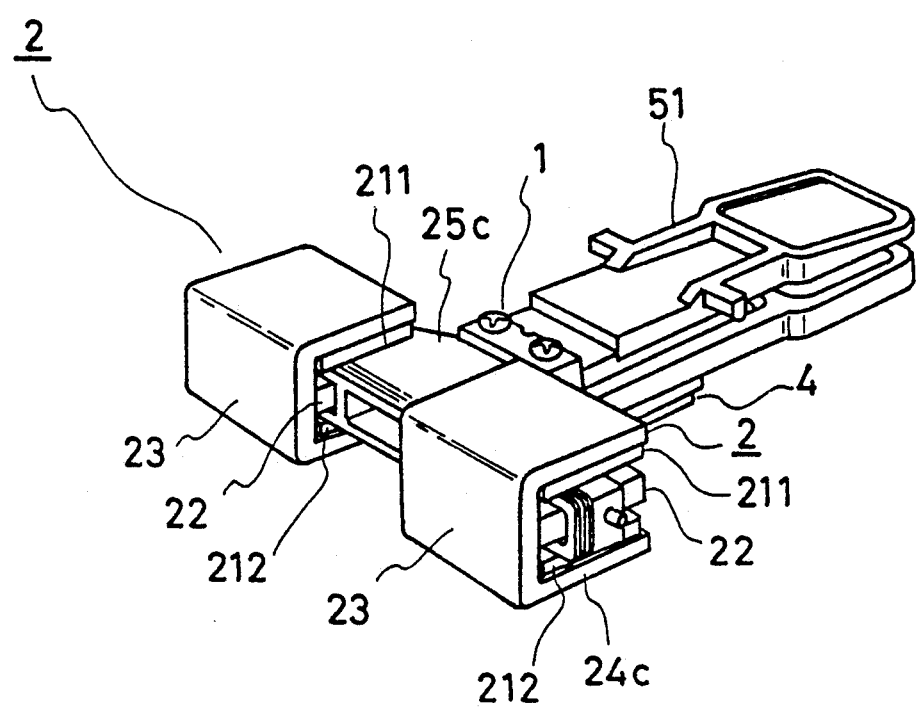
FIG. 4 is a perspective view of a voice coil motor and a carriage of the second embodiment.

In another embodiment of the present invention illustrated in FIGS. 3 and 4, the E-shaped magnetic circuit 2 for a voice coil motor includes a coil bobbin 25c defined as being longer than the lateral width of the coil bobbin 25 in the foregoing embodiment, a voice coil 24c having a longer side than the voice coil 24 in the foregoing embodiment, and an E-shaped magnetic circuit divided into left and right fractions, an interdistance of which is expanded. The E-shaped magnetic circuit 2 includes, as illustrated in FIG. 4, a center yoke 22, an upper magnet 211, a lower magnet 212, and an outer circumferential yoke 23. Hereby, the length of a gap magnetic flux portion as the voice coil motor is increased as the feature of the embodiment for high efficiency of the device and compaction of the motor including the carriage.

Operation of the invention is as follows.

When a 3.5 inch flexible disk cartridge 6 for example is employed as a recording medium, the head positioned on an arbitrary recording track is moved to the next track, and at that time recording track information previously written on the magnetic disk 61 is read by the read/write head 5. The recording track information and track positioning information set on the linear scale 32 of the linear encoder are generated in the encoder 31 and fed to the control circuit, which correspondingly generates a control current which is sent to the voice coil 24 of the voice coil motor. The voice coil 24 is located in a magnetic gap formed of the upper magnet 211, lower magnet 212, and center yoke 22, and produces a force according to the left hand law of Fleming. The force produced by the voice coil 24 integrally coupled to the rear end of the carriage 1 is directly transmitted through the coil bobbin 25 to the carriage 1 united with the coil bobbin 25.

The carriage 1 which is mounted on the movable guide 4 moves in a straight line along the movable guide 4. Therefore, the linear scale 32 and the read/write head 5 both coupled to the carriage 1 and the coil bobbin 25 feed back information with the movement of the carriage 1 to the control circuit where a control current is in turn controlled following a difference between the foregoing information and a predetermined target for head positioning control.

When a conventional 3.5 inch flexible disk cartridge which no recording track information has previously been written is employed, track positioning information generated by the linear scale 32 and the encoder 31 of the linear encoder is used to position the read/write head 5.

Figure 5:
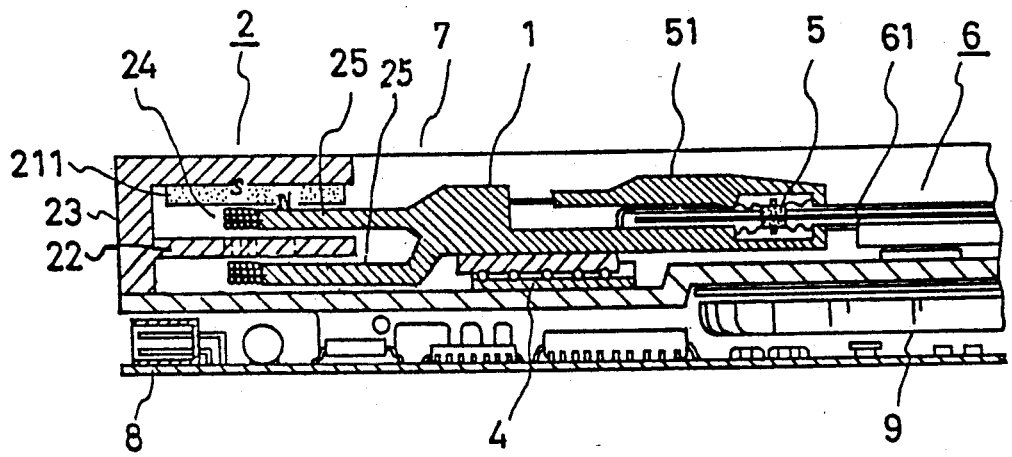
FIGS. 5 and 6 are sectional views each partly illustrating a further another embodiment of the present invention.
Figure 6:
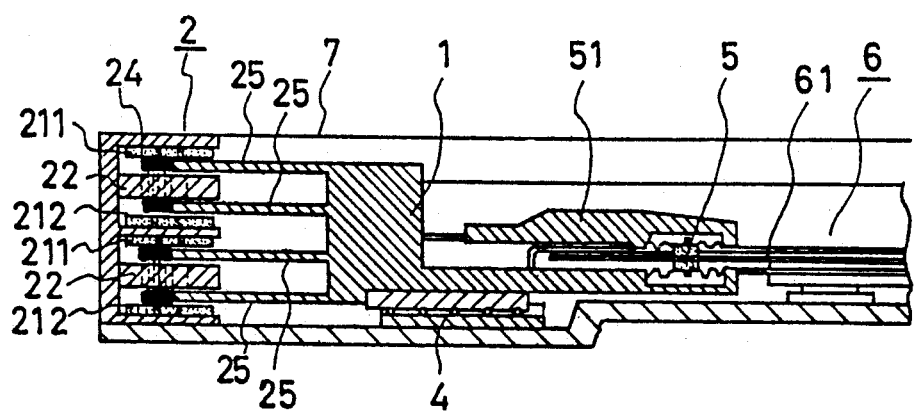
Figure 7:
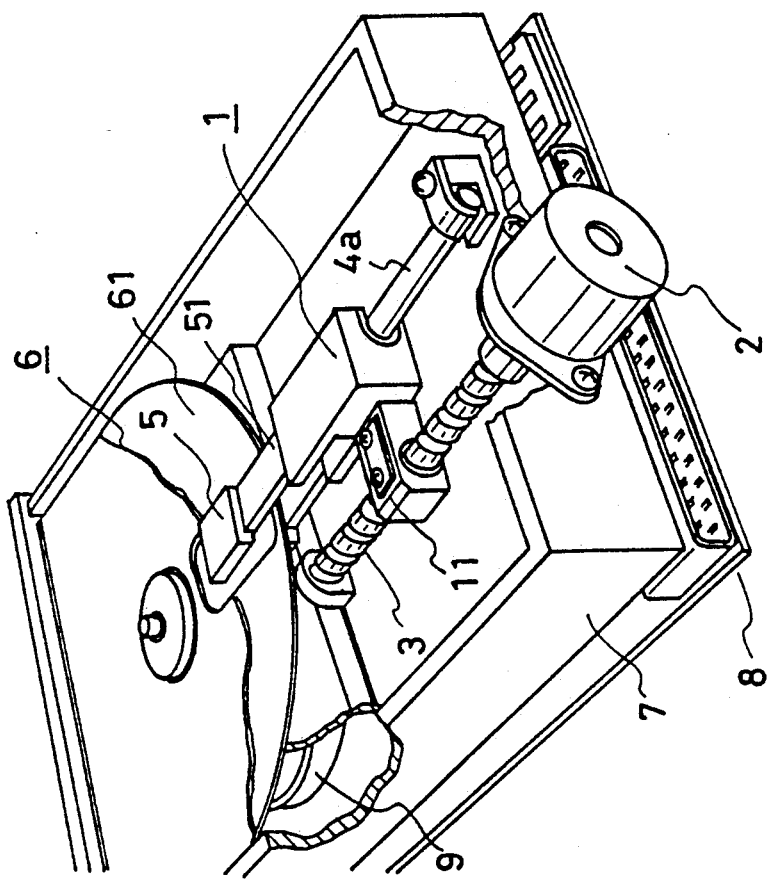
FIG. 7 is a perspective view, in section in part, illustrating a conventional flexible disk device in a conventional lead screw system.
Figure 8:
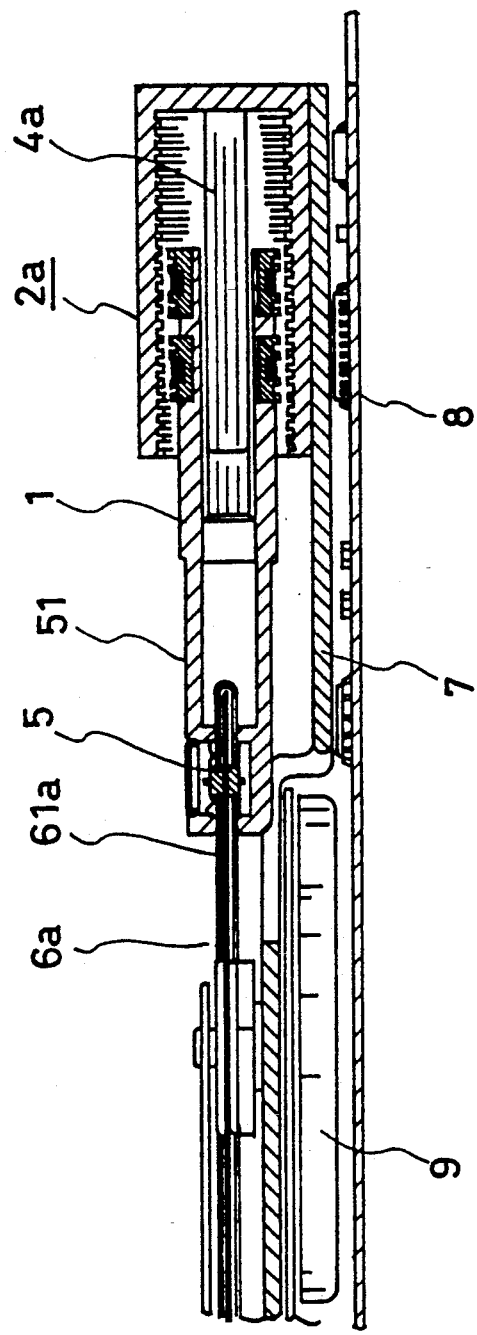
FIG. 8 is a sectional view, taken along a central and vertical line, illustrating a conventional flexible disk device including a head positioning mechanism using a linear pulse motor.

Herein, the present invention may include another type of the magnetic circuit as illustrated in FIG. 5 in which there is provided a double bobbin 25, each of which is disposed between the magnet 211 and the yoke 22, and which are held by the outer circumferential yoke 23. Additionally, as illustrated in FIG. 6, a similar magnetic circuit may be provided, in which three or more bobbins 25 are provided, each of which is disposed between the magnet and the yoke.

Herein, although in the above embodiment the case with use of the 3.5 inch flexible disk cartridge was described, the present invention may also be applied to apparatuses using flexible disk cartridges of 3, 2.5, and 2 inches, and the like. Still more, the identical effect can be expected also with devices incorporating 5.25 and 8 inches, and the like.

Additionally, although in the above embodiment the ball guide was employed, a bush bearing may be incorporated.

Furthermore, although in the above embodiment the optical linear encoder was employed as the encoder, a magnetic sensor may be incorporated. Additionally, although in the above embodiment the scale section of the linear encoder was mounted on the carriage, a sensor section may instead be mounted.

According to the flexible disk device of the present invention, as described above, the E-shaped magnetic circuit is formed into a rectangular flat structure together with the voice coil partly constituting the voice coil motor, which structure is in turn integrally coupled in particular with the rear end of the carriage to directly drive the carriage. Accordingly, servo control at recording track density several times the conventional case can be realized, allowing high speed head positioning. Additionally, the E-shaped magnetic circuit is divided into right and left two fractions, a mutual distance between which fractions is expanded, and there are inserted into both magnetic gaps thus established the coil bobbin mounted on the other end of the carriage expanded and extended so as to be portioned out to the left and right from the center thereof and the rectangular voice coil disposed at the rear end of the former. Therefore, the length of the gap magnetic flux portion as the voice coil motor is increased to result in the effective use of the motor and in the compaction of the same including the carriage.

What is claimed is:

1. A disk drive device for reading and writing information on a disk, the device comprising:
    a frame;
    a carriage slidably mounted on the frame, the carriage having a first end and a second end;
    a read/write head coupled to the first end of the carriage for reading and writing information on the disk;
    a first E-shaped magnetic circuit having
        a first support frame,
        a first pair of magnets mounted to the first support frame, and
        a first central yoke;
    a second E-shaped magnetic circuit having
        a second support frame,
        a second pair of magnets mounted to the second support frame, and
        a second central yoke,
    the first and second E-shaped magnetic circuits being in spaced apart relationship, each magnetic circuit having an open end facing the disk;
    a coil bobbin coupled to the second end of the carriage; and
    a single voice coil coupled to the coil bobbin, the coil bobbin and the single voice coil surrounding the first and second yokes without surrounding the support frames.

2. A disk drive device for reading and writing information on a magnetic disk, the disk rotating in a first plane, the device comprising:
    a frame;
    a carriage slidably mounted on the frame, the carriage having a first end and a second end;

a read/write head coupled to the first end of the carriage for reading and writing information on the disk;

a first magnetic circuit having a first support frame, a first magnet, and a first yoke;

a second magnetic circuit having a second support frame, a second magnet, and a second yoke, the first and second magnetic circuits being stacked along an axis which is perpendicular to the first plane, the first and second yokes extending in parallel to each other and to the first plane;

first and second coil bobbins coupled to the second end of the carriage and spaced a distance from each other and aligned in the axis which is perpendicular to the first plane; and first and second voice coils, one mounted on each coil bobbin, the voice coils being in parallel with each other, each of the voice coils surrounding one of the yokes, the voice coils arranged to propel the carriage along one axis.

3. The device of claim 2 wherein the carriage has a movable guide on the bottom of the carriage which is slidably coupled to the frame at the center of gravity of the carriage, the carriage being coupled to the frame only through the movable guide.

4. The device of claim 2 wherein each magnetic circuit is an E-shaped circuit, wherein the supports for each circuit are C-shaped having upper and lower extensions with the yokes for each circuit are intermediate the upper and lower extensions and in parallel with the extensions.

5. The device of claim 2 further comprising a third coil bobbin with a third voice coil coupled to the second end of the carriage and oriented in the axis perpendicular to the first plane.

6. A disk drive device for reading and writing information on a disk rotating in a first plane, the device comprising:

a frame;

a carriage slidably mounted on the frame for moving along one axis toward the disk, the carriage having a central portion, a first end, and a second end, the second end having two integral flared portions extending away from opposing sides of the central portion, the flared portions and central portion being in a plane parallel to the first plane;

a read/write head centrally coupled to the first end of the carriage for reading and writing information on the disk;

a first E-shaped magnetic circuit having
 a first support frame,
 a first pair of magnets mounted to the first support frame, and
 a first central yoke;

a second E-shaped magnetic circuit having
 a second support frame,
 a second pair of magnets mounted to the second support frame, and
 a second central yoke, the first and second E-shaped magnetic circuits being in spaced apart relationship defining a gap between the magnetic circuits, the gap being at least as wide as the central portion of the carriage, each magnetic circuit being positioned having an open end facing the disk;

a coil bobbin coupled to the flared portions of the second end of the carriage; and a single voice coil coupled to the coil bobbin, the coil bobbin and the single voice coil extending through each of the magnetic circuits and surrounding the first and second yokes.

* * * * *